(12) United States Patent
Fox et al.

(10) Patent No.: US 8,234,847 B2
(45) Date of Patent: Aug. 7, 2012

(54) AUTOMATIC CONNECTION MECHANISM FOR MID-MOUNTED IMPLEMENT

(75) Inventors: Robert Neil Fox, Appling, GA (US);
Eric A. Howard, Lincolnton, GA (US);
Carlos A. Diaz, Trenton, SC (US);
Harlin J. Trefz, Jackson, TN (US);
Benjamin J. Swart, Allenton, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/942,597

(22) Filed: Nov. 9, 2010

(65) Prior Publication Data
US 2011/0099963 A1    May 5, 2011

Related U.S. Application Data

(63) Continuation of application No. 11/860,738, filed on Sep. 25, 2007, now Pat. No. 7,877,972.

(51) Int. Cl.
*A01D 34/00* (2006.01)
(52) U.S. Cl. .......................................... 56/15.6
(58) Field of Classification Search ............... 56/6, 14.7, 56/14.9, 15.2, 15.3, 15.6–15.8, 17.1, 320.1, 56/DIG. 9, DIG. 22; 172/272, 780, 781; 37/231
See application file for complete search history.

(56) References Cited

U.S. PATENT DOCUMENTS

| | | | |
|---|---|---|---|
| 3,403,802 A * | 10/1968 | Lundell | 414/715 |
| 3,508,386 A | 4/1970 | Borchandt et al. | |
| 3,871,463 A | 3/1975 | Geisthoff | |
| 3,881,563 A | 5/1975 | Hammersmith | |
| 3,948,025 A | 4/1976 | Erdman | |
| 3,961,677 A | 6/1976 | Geisthoff | |
| 4,090,725 A | 5/1978 | Perin | |
| 4,300,332 A | 11/1981 | Jackson | |
| 4,340,240 A | 7/1982 | Anderson | |
| 4,817,728 A | 4/1989 | Schmid et al. | |
| 4,944,354 A | 7/1990 | Langen et al. | |
| 5,025,617 A | 6/1991 | Kuhn et al. | |
| 5,193,623 A | 3/1993 | Burette | |
| 5,244,047 A | 9/1993 | Eudy | |
| 5,528,889 A | 6/1996 | Kure et al. | |
| 5,657,825 A | 8/1997 | Englund | |
| 6,102,131 A | 8/2000 | Malinowski | |
| 6,237,957 B1 | 5/2001 | Takekata et al. | |
| 6,293,077 B1 | 9/2001 | Plas et al. | |
| 6,408,546 B2 | 6/2002 | Curtis | |
| 6,470,660 B1 | 10/2002 | Buss et al. | |
| 6,584,756 B2 | 7/2003 | Buss | |
| 6,679,037 B1 | 1/2004 | Hitt et al. | |
| 7,011,330 B2 | 3/2006 | Blanton | |
| 7,028,456 B2 | 4/2006 | Thatcher et al. | |
| 2006/0055140 A1 | 3/2006 | Trefz et al. | |
| 2007/0074496 A1 | 4/2007 | Sundberg et al. | |

FOREIGN PATENT DOCUMENTS

JP      6-253639      9/1994

* cited by examiner

*Primary Examiner* — Thomas B Will
*Assistant Examiner* — Joan Misa

(57) ABSTRACT

An automatic connection mechanism for a mid-mounted implement to a tractor is disclosed. The automatic connection mechanism includes a rear lift linkage pivotably attached to the tractor, that automatically and releasably engage the rear of the implement. The forward lift linkage is pivotably attached to the front of the implement, and automatically and releasably engages the forward end of the tractor. A PTO coupling member also is attached to the rear lift linkage to engage an opposing PTO coupling member on the implement.

10 Claims, 7 Drawing Sheets

AUTOMATIC CONNECTION MECHANISM FOR MID-MOUNTED IMPLEMENT

This application is a continuation of prior application Ser. No. 11/860,738, filed Sep. 25, 2007 now U.S. Pat. No. 7,877,972.

FIELD OF THE INVENTION

This invention relates generally to tractors and utility vehicles used for agricultural work and lawn care, and particularly to mounting implements to such tractors or vehicles. More specifically, the invention relates to an automatic connection mechanism for a mid-mounted implement such as a mower deck.

BACKGROUND OF THE INVENTION

Tractors and utility vehicles used for agricultural work and lawn care may carry a mid-mounted implement such as a mower deck that covers two or more rotary cutting blades on the lower ends of vertically oriented spindles. The implement may be attached to a tractor or other vehicle with mechanical linkages that allow the implement to be carried at a range of different heights, and raised or lowered between each height. Suspension devices may provide a parallelogram linkage arrangement between the front and back portions of the implement and vehicle to assure that as the implement is raised or lowered, the sides, front and rear of the implement are lowered or raised equally. For example, U.S. Pat. Nos. 5,025,617 and 6,584,756 relate to parallelogram lift linkages for mid-mounted implements.

Mower decks, snow blowers, and similar implements are not utilized full time with a tractor, so it is desirable that a suspension mechanism allow quick, easy removal and reinstallation of the implement. A mid-mounted implement also must be carefully positioned under the tractor at a specified location where the implement may be connected to the lift system linkage and PTO coupling members. Various mounting points in the lift system linkage must be aligned, and a tractor PTO shaft may be connected and secured to a propeller shaft on the implement using PTO coupling members.

Connecting a mid-mounted implement may be difficult due at least in part to the weight of the implement and connection points of the lift system that must be aligned. Additional effort may be required to secure PTO coupling members together. Removing a mid-mounted implement from under a tractor also may be difficult for the same reasons.

An automatic connection mechanism is needed for an implement that can be quickly and easily connected and disconnected under a tractor. A PTO coupling is needed that can reduce the difficulty of securing a tractor PTO to a propeller shaft on the implement.

SUMMARY OF THE INVENTION

The invention provides an automatic connection mechanism for a mid-mounted implement to a tractor. The rear lift linkage includes a pair of rear draft links pivotably connected to a tractor frame. Each rear draft link automatically and releasably engages the rear of the mid-mounted implement. The forward lift linkage is pivotably connected to the front end of the implement, and automatically and releasably engages the forward end of the tractor frame. Additionally, a PTO coupling is provided that can automatically and releasably engage a tractor PTO to a propeller shaft on an implement.

DESCRIPTION OF THE PREFERRED EMBODIMENT

Figure 1:
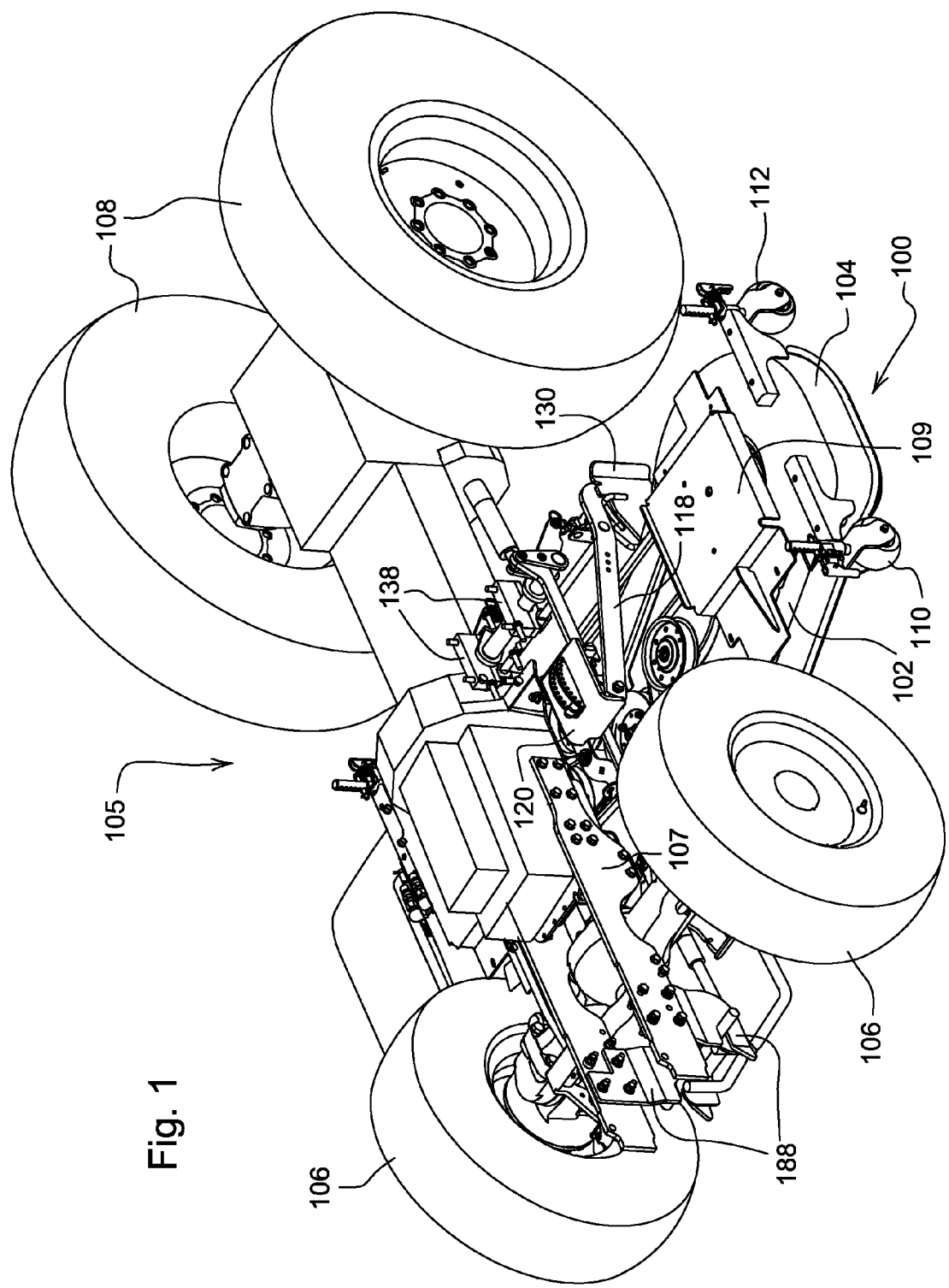
FIG. 1 is a perspective view of a tractor frame with an automatic connection mechanism for a mid-mounted implement according to a first embodiment of the invention.

In one embodiment shown in FIG. 1, a mid-mounted implement is shown as mower deck 100 covering a plurality of rotary cutting blades, and preferably three cutting blades, on the lower ends of vertically oriented spindles. Alternatively, the mid-mounted mower deck may cover two cutting blades, or more than three cutting blades. The mid-mounted implement may have a top panel 102, and downward extending edges 104 on its front, rear, left and right sides. The implement may have a total width greater than the track width of at least one set of wheels of tractor 105, and is shown positioned under tractor frame 107 between front wheels 106 and rear wheels 108. While a tractor drives over the implement, each front wheel may be supported by plate 109 mounted on the top surface of the implement.

In one embodiment, mid-mounted implement 100 may have gauge wheels 110 mounted adjacent the front edge of the implement, and gauge wheels 112 mounted adjacent the rear edge of the implement. In a cutting position, as shown in FIG. 1, the mower deck may be at least partially supported by the gauge wheels at various heights, and/or the gauge wheels may be positioned to avoid or reduce scalping of turf by the mower blades. In a drive over position, the gauge wheels may be retracted sufficiently so that the implement rests on the ground surface and is not supported by the gauge wheels.

Figure 2:
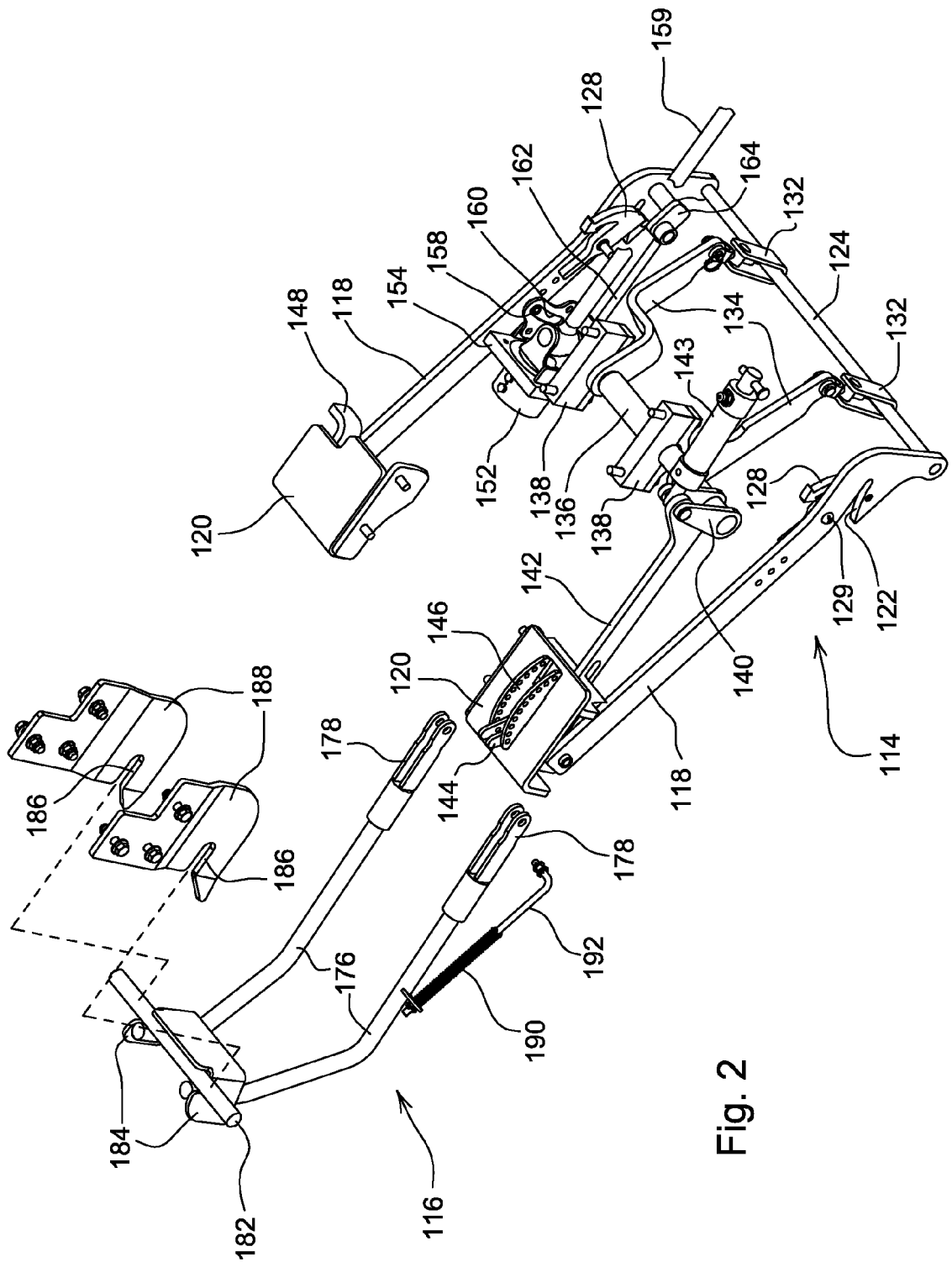
FIG. 2 is a perspective view of front and rear linkages of an automatic connection mechanism for a mid-mounted implement according to a first embodiment.

In the embodiment shown in FIGS. 1 and 2, the automatic connection mechanism includes rear lift linkage 114 and forward lift linkage 116, each linkage operating independently of the other. The rear lift linkage can support the rear of the implement at two separate points at or near the rear of the implement, and the front lift linkage can support the front of the implement at or near its front end. The pair of lift linkages together provide a four point parallelogram lift arrangement. Using the pair of lift linkages, a mid-mounted implement may be automatically and releasably connected to tractor 105 after the implement is straddled between the tractor's front and rear wheels, and preferably after the tractor's front wheels drive over the implement. After the implement is positioned between the front and rear wheels, the tractor may continue to drive forward so that the front and rear lift linkages automatically connect the implement to the tractor.

In one embodiment, rear lift linkage 114 may be pivotably attached to tractor frame 107. Rear lift linkage 114 may include left and right rear draft links or arms 118. The first or forward ends of rear draft links 118 may be pivotably attached to the tractor frame 107 or tractor body between the tractor's front and rear wheels. In the embodiment shown in FIG. 2, the first or forward ends of the rear draft links are pivotably attached to left and right rear support brackets 120, which are attached to the tractor frame or body. Each rear draft link 118 may include a forward facing slot 122 at or adjacent the second or rear end of the rear draft link. Additionally, rear link rod 124 may connect together left and right rear draft links 118 at or adjacent their second or rear ends. Rear link rod 124 may be suspended by left and right rear hangers 132 which are pivotably attached to left and right rear lift support straps 134. The rear lift support straps are connected to mid rock shaft 136 that is pivotally mounted in bearing blocks 138 secured to tractor frame 107.

Figure 4:
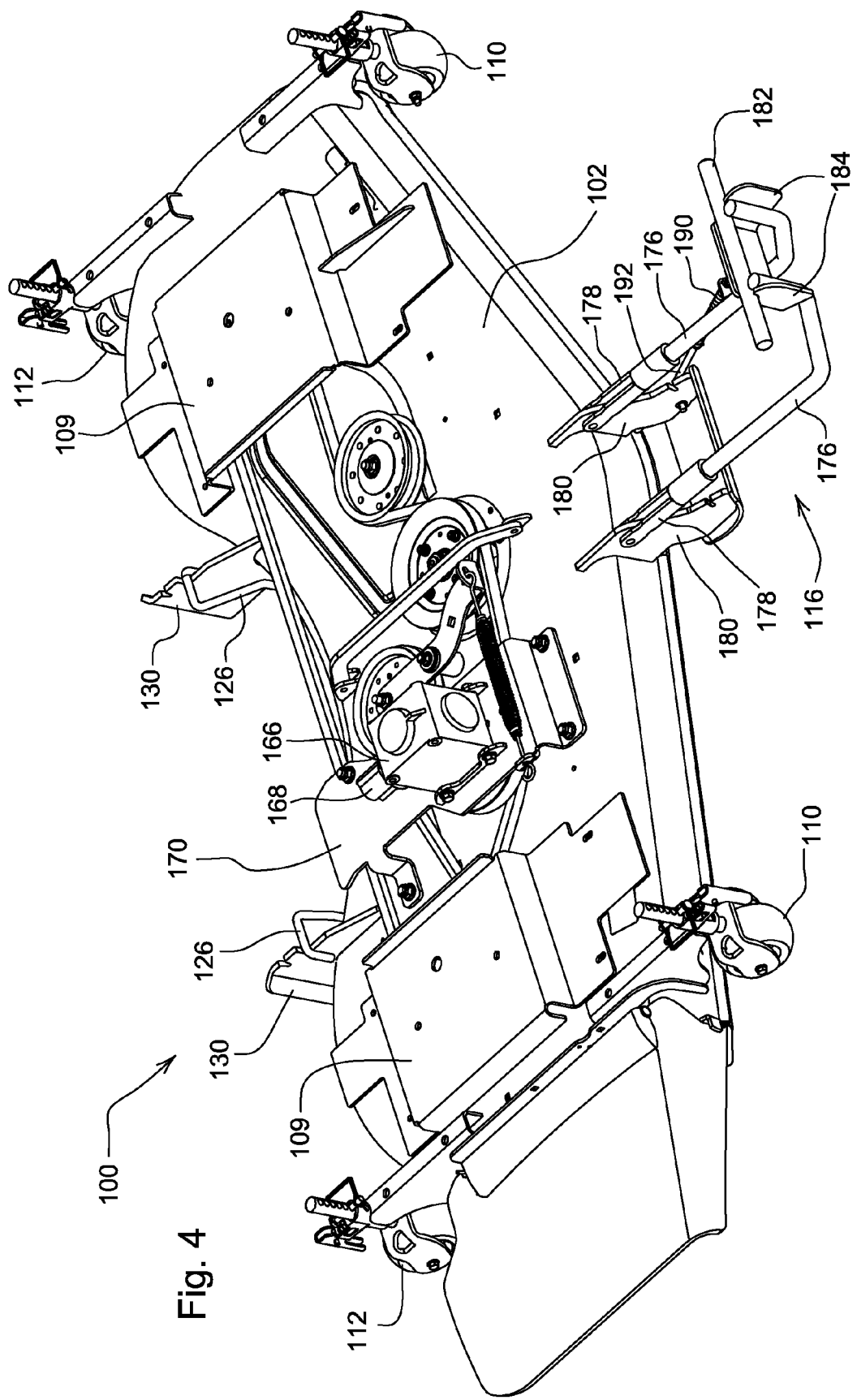
FIG. 4 is a perspective view of a mid-mounted implement with an automatic connection mechanism according to a first embodiment of the invention.

In one embodiment, rear lift linkage 114 can automatically and releasably engage two separate attachment members at or near the rear edge of the implement. For example, as shown in FIG. 4, the attachment members at the rear of the implement may be a pair of rear implement lift rods 126, which may be wire forms. As the tractor moves forward, the left and right rear implement lift rods 126 can enter slots 122 in rear draft links 118. Once rear implement lift rods 126 fully enter slots 122, the lift rods may be automatically and releasably held in the slots by rear lock plates 128. The rear lock plates may pivot on pins 129 to ride over and secure the implement lift rods in the slots. Rear lock plates 128 may be biased or urged by gravity to a closed or locked position. Left and right rear mounting plates 130 may provide guide surfaces to help direct rear draft links 118 laterally inwardly so that lift rods 126 are properly aligned to enter slots 122.

In one embodiment, hydraulic lift cylinder 143 may be used to raise and lower rear lift linkage 114. The hydraulic lift cylinder may be connected to bell crank 140 to assist in lifting or lowering the implement from the ground surface. Alternatively, a manually operated lever (not shown) may be connected to bell crank for raising and lowering the implement.

In one embodiment, to adjust the height of the implement once it is lowered, bell crank 140 is provided between mid rock shaft 136 and the rear end of height lock link 142. A first or front end of height lock link 142 is pivotably connected to height lock lever 144. Height lock lever pivots inside sector 146 mounted to one of rear support brackets 120. Stop 148 may be provided in the other of rear support brackets 120 to limit pivotal motion of the first or forward end of the rear draft links 118. To adjust the cutting height of mid-mounted implement 100, the operator may pivot height lock lever 144 to extend or retract height lock link 142, which pivots bell crank 140 to provide a lower stop for the implement once the lift cylinder or manual lever releases the implement.

Figure 3:
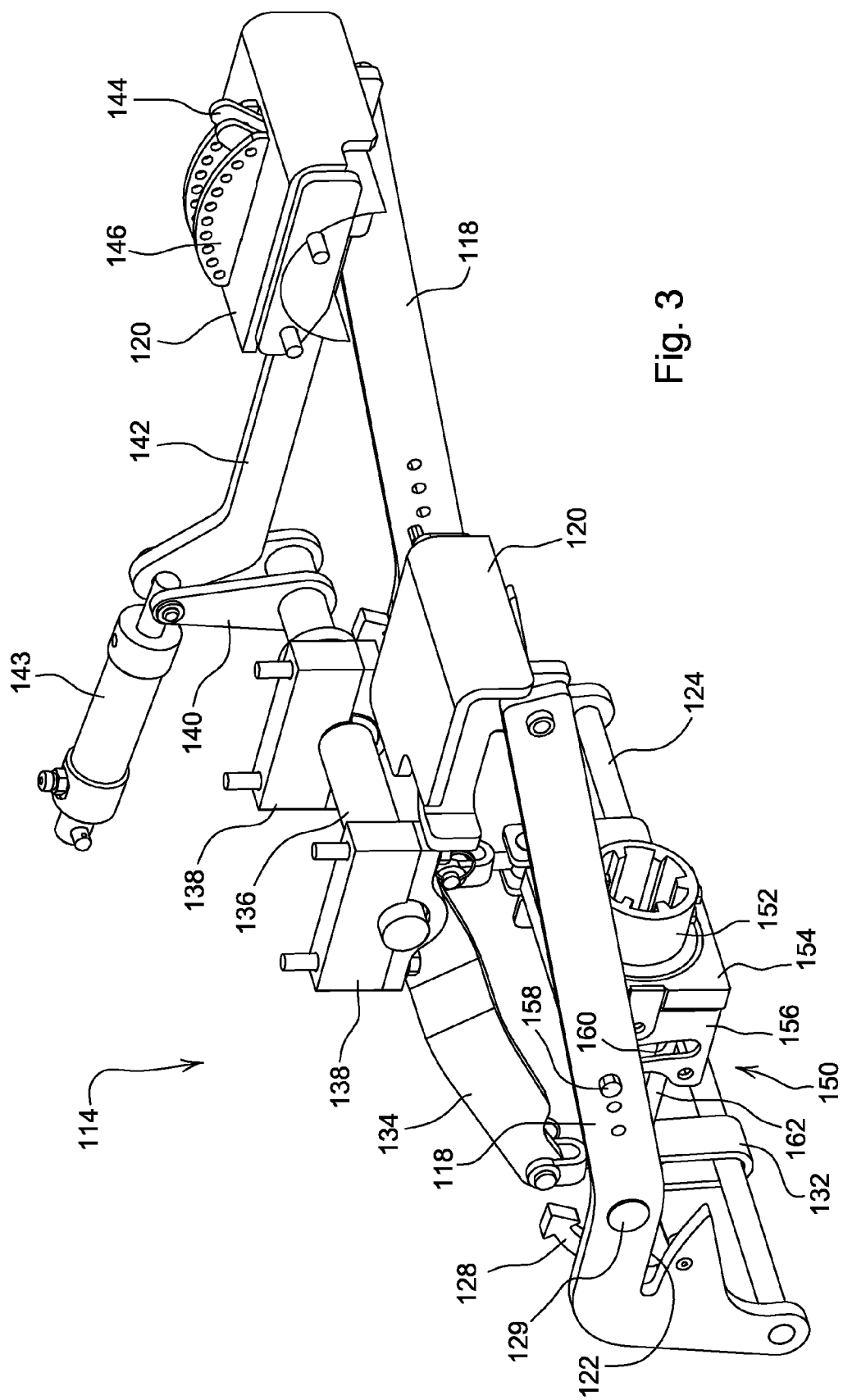
FIG. 3 is a perspective view of a PTO coupling of an automatic connection mechanism for a mid-mounted implement in a first embodiment of the invention.

In one embodiment, a first PTO coupling member is attached to PTO shaft 159 from the tractor. The first PTO coupling member may be mounted to the rear lift linkage so that it is properly aligned to automatically and releasably engage a second PTO coupling member attached to the implement. For example, in a preferred embodiment, the first PTO coupling member may be female PTO coupling member 152 mounted to rear lift linkage 114, as shown in more detail in FIGS. 2 and 3. The second PTO coupling member may be male PTO coupling member 168 on the implement. Alternatively, the male PTO coupling member may be mounted on the rear lift linkage and the female PTO coupling member may be on the implement.

In one embodiment, during automatic connection of the mid-mounted implement, the first or female PTO coupling member 152 automatically and releasably engages the second or male PTO coupling member 168. The first or female PTO coupling member may be rotatably mounted in bearing housing or carrier 154. The bearing housing or carrier is supported by coupler support 156. Coupler support 156 may be attached to a rear draft link 118 so that the coupler support, and the first PTO coupling member, can move or slide vertically with respect to the rear draft link.

In one embodiment, rear mounting plates 130 may guide rear draft links 118 laterally so that rear implement lift rods 126 enter slots 122 in the rear draft links. Rear mounting plates 130 also guide first PTO coupling member 152 attached to rear draft link 118, into the correct engagement position laterally on the implement. Mounting the first PTO coupling member to the rear lift linkage places the first PTO coupling member in the correct position to engage the opposing second PTO coupling member on the mid-mounted implement.

In one embodiment, the second PTO coupling member may be on gearbox 166 on the top surface 102 of mid-mounted implement 100. For example, the second PTO coupling member may be male PTO coupling member 168 attached to propeller shaft on gearbox 166. Rear mounting plates 130 guide the rear draft links into alignment, and ensure that the male and female PTO coupling members are in the correct lateral position. Additionally, coupler alignment ramp 170 may be provided on the top surface 102 of the implement to ensure the male and female PTO coupling members are in the correct vertical position for engagement. Coupler alignment ramp 170 may be a sloped surface adjacent the rear edge of the implement. The female PTO coupling member 152 may slide or ride slightly upwardly on the coupler alignment ramp toward the same vertical position as male PTO coupling member 168 on the implement.

In one embodiment, the first PTO coupling member can move or slide vertically with respect to the rear lift linkage, and/or pivot on one or more axes. For example, female PTO coupling member 152 may be supported by coupler support 156, which is attached to rear draft link 118 so that the female PTO coupling member can move vertically and/or pivot on one or more axes. More specifically, coupler support 156 and rear draft link 118 may be connected together using a bolt or rod and bushing 158 that slides vertically within slot 160. Additionally, coupler support rod 162 may connect coupler support 156 to coupler support plate 164. Coupler support plate 164 may be pivotably mounted adjacent a rear end of rear draft link 118.

In one embodiment, female PTO coupling member 152 can automatically and releasably engage male PTO coupling member 168 as each coupling member is rotated to various different rotational positions. For example, the female PTO coupling member may be internally splined and the male PTO coupling member may be externally splined. Preferably, the female PTO coupling member has internal splines, and the male PTO coupling member has external splines. The splines provide surface-to-surface contact for rotational engagement.

Referring again to the embodiment shown in FIG. 2, the four bar parallelogram linkage includes forward lift linkage 116 that is pivotably mounted to mid-mounted implement 100. The forward lift linkage may include left and right forward links 176. Transverse rod 182 may be connected to the first or front ends of forward links 176, connecting the forward links together. The second or rear ends of forward links 176 may include clevises 178 for pivotably mounting using a pin to front mounting plates 180 at the front edge of the implement. Guide plates 184 may be provided at the front ends of forward links 176 to provide guide surfaces to help direct transverse rod 182 into slots 186 into a pair of transversely spaced apart and forward opening jaws or hook hangers 188 mounted to the forward end of tractor frame 107. Additionally, spring 190 and rod 192 are connected between a forward link 176 and front mounting plate 180, to urge the forward links into position where transverse rod 182 enters and remains in slots 186.

In one embodiment, mid-mounted implement 100 may be quickly and automatically disengaged from tractor 105. After the operator lowers the implement so that it rests on the ground surface, then the operator may pivot the lock plates 128 before backing up the tractor. The transverse rod 182 of the forward lift linkage automatically unhooks from hangers 188 near the front end of the tractor. Hangers 188 may be located in front of or behind the front wheels of the tractor. The operator also may pivot left and right rear lock plates 128 from the closed or locked position to an unlocked position. As the tractor continues to back up, the tractor completely disengages and separates the front and rear lift linkages, and the PTO coupling members. The rear lock plates automatically reset once the rear lift linkage is disengaged.

Figure 5:
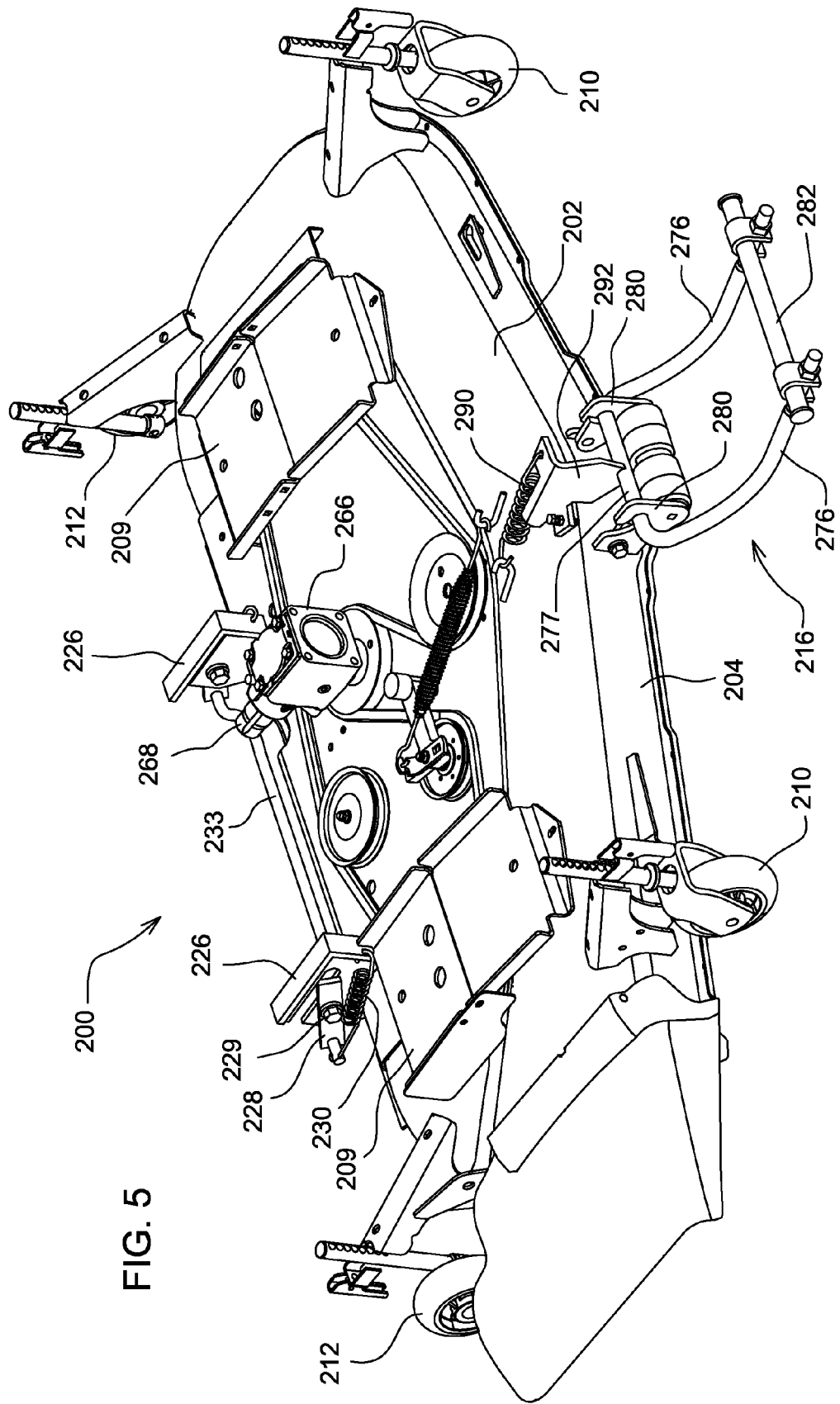
FIG. 5 is a perspective view of a mid-mounted implement with an automatic connection mechanism according to a second embodiment of the invention.
Figure 6:
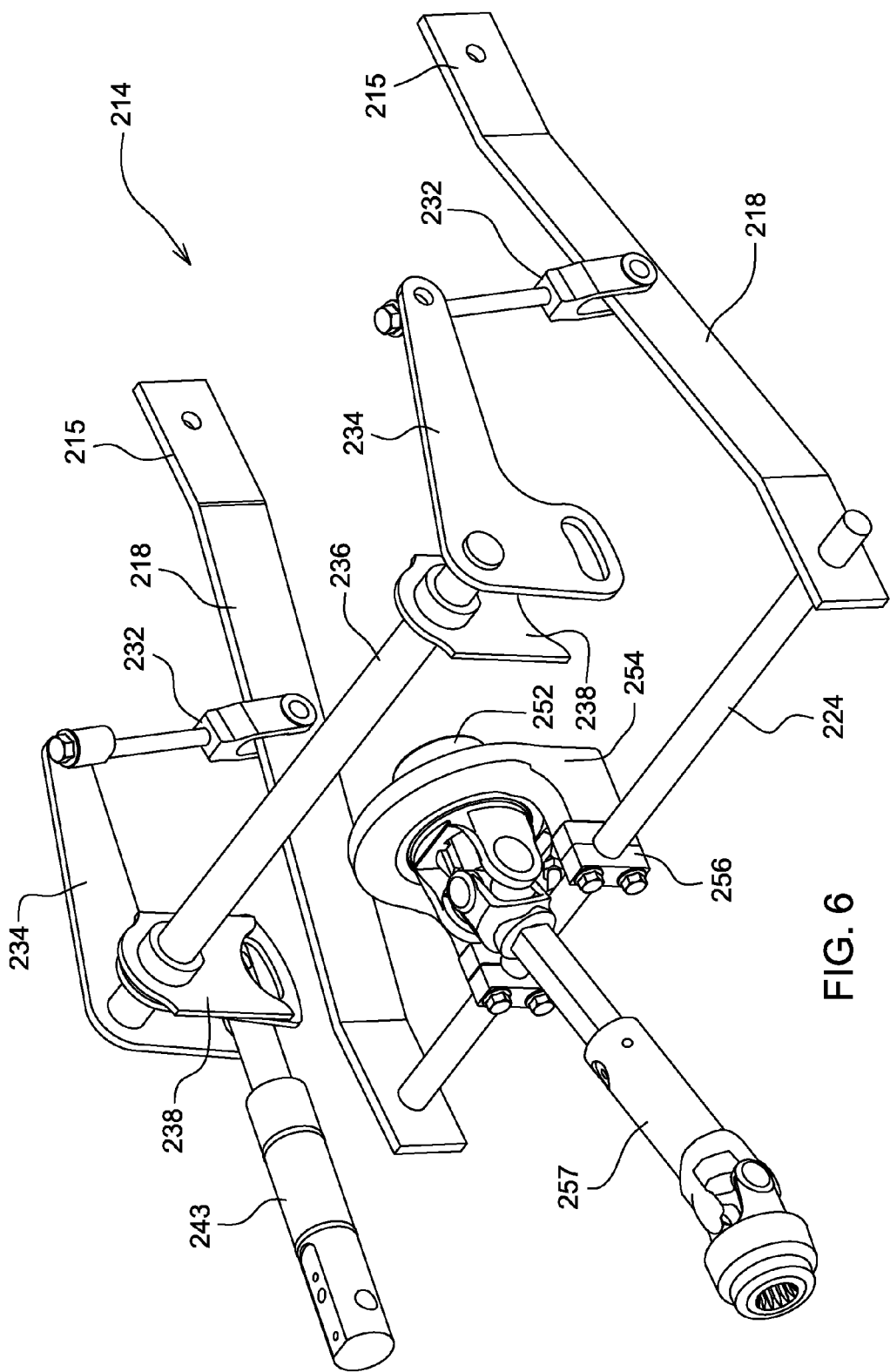
FIG. 6 is a perspective view of a rear linkage of an automatic connection mechanism for a mid-mounted implement according to a second embodiment.

FIGS. 5-6 show a mid-mounted implement 200 that can be automatically connected to a tractor frame using a second embodiment. The second embodiment of the automatic connection mechanism includes rear linkage 214 and front linkage 216. The mid-mounted implement may be a mower deck having top panel 202 and downward extending edges 204 on its front, rear, left and right sides. While a tractor drives over the implement, each front wheel may be supported by plate 209 mounted on the top surface of the implement. The implement 200 also may have gauge wheels 210 mounted adjacent the front edge of the implement, and gauge wheels 212 mounted adjacent the rear edge of the implement. In a cutting position, the implement may be at least partially supported by the gauge wheels, and/or the gauge wheels may be positioned to avoid or reduce scalping of turf by the mower blades. In a drive over position, the gauge wheels may be retracted so that the implement rests on the ground surface.

In a second embodiment, the mid-mounted implement may be automatically and releasably connected to a tractor after the implement is straddled between the tractor's front and rear wheels, and preferably after the tractor's front wheels drive over the implement. After the implement is between the front and rear wheels, the tractor may continue to move forward so that the lift linkages of the present invention automatically connect the implement to the tractor.

In a second embodiment, rear lift linkage 214 may be pivotably attached to the tractor frame. Rear lift linkage 214 may include left and right rear draft links or arms 218. The first or forward ends 215 of rear draft links 218 may be pivotably attached to the tractor frame between the tractor's front and rear wheels. Rear link rod 224 may connect together left and right rear draft links 218 at or adjacent their second or rearward ends.

In a second embodiment, rear lift linkage 214 can automatically and releasably engage a pair of attachment members at the rear edge of the implement. For example, as shown in FIG. 5, the attachment members at the rear of the implement may be a pair of rear draft brackets 226 mounted on the implement. Each of the rear draft bracket includes a slot to capture rear link rod 224. As the tractor moves forward over the implement, rear link rod 224 may enter the pair of rear draft brackets. Once the rear link rod fully enters the rear draft brackets, the rear link rod may be automatically and releasably held there by latches 228. The latches may pivot on pins 229 to ride over and secure the rear link rod in the rear draft brackets. Latches 228 may be biased by spring 230 to an over center spring lock to a locked position. Additionally, latches 228 may be linked by rod 233 to allow simultaneously closing or releasing both latches.

In a second embodiment, the four bar parallelogram linkage may be raised and lowered using hydraulic lift cylinder 243. Hydraulic lift cylinder 243 may be connected to bell crank 234. Each rear draft bracket 218 may be suspended by left and right rear hangers 232 which are pivotally attached to left and right bell cranks 234. The left and right bell cranks are connected to opposing ends of mid rock shaft 236 that is pivotably mounted in brackets 238 and/or bearing blocks secured to the tractor frame. Alternatively, a manually operated lever (not shown) may be connected to bell crank 234 for lifting and lowering the implement. Once the implement is lowered, the cutting height may be adjusted in a manner similar to that shown in the first embodiment. The height adjustment mechanism may provide a lower stop for the implement once the lift cylinder or manual lever releases the implement.

In a second embodiment, the automatic connection of a mid-mounted implement includes a first PTO coupling member attached to rear lift linkage 214. Attaching the first PTO coupling member to the rear lift linkage provides proper alignment that is needed to automatically and releasably engage the first PTO coupling member with a second PTO coupling member on the implement. In a preferred embodiment, the first PTO coupling member may be female PTO coupling member 252 attached to rear lift link rod 224, and the second PTO coupling member may be male PTO coupling member 268 mounted on the implement.

In a second embodiment, during automatic connection of the mid-mounted implement, the first or female PTO coupling member 252 automatically and releasably engages the second or male PTO coupling member 268. The first or female PTO coupling member may be attached to PTO shaft 257, and rotatably mounted in bearing housing or carrier 254. The bearing housing or carrier is supported by coupler support 256. Coupler support 256 may be attached to rear link rod 224 so that the coupler support, and PTO coupling member, may pivot on a horizontal axis of rear link rod 224. As a result, the first PTO coupling member is in the correct position to engage an opposing second PTO coupling member on the mid-mounted implement. The opposing second PTO coupling member may be on gearbox 266 mounted on the top surface 202 of mid-mounted implement 200.

In a second embodiment, female PTO coupling member 252 can automatically and releasably engage male PTO coupling member 268 as each coupling member is rotated to various different rotational positions. As in the first embodiment, the female and male coupling members may be splined. For example, male PTO coupling member may have external splines. Alternatively, the female coupling member may be provided on the implement gearbox, and the male coupling member may be connected to the rear lift linkage.

Referring still to the second embodiment shown in FIGS. 5 and 6, forward lift linkage 216 may be pivotably mounted to the front end of mid-mounted implement 200. The forward lift linkage may be a U-shaped bar with left and right forward portions 276 and base portion 277 which loops around front mounting plates 280 at the front edge of the implement. A rod or abutment may hold the U-shaped bar in the front mounting plates. Transverse rod 282 may be connected to the first or front ends of forward links 276. The transverse rod may be connected to the forward links with linkages allowing adjustment of the rod's position to engage a tractor's front hangers. Plate 292 may be fastened to the center portion of the forward lift linkage, and spring 290 may urge plate 292 to pivot the forward lift linkage up into position where transverse rod 282 enters and remains in the transversely spaced jaws or hooks at or near the front of the tractor frame.

In one embodiment, mid-mounted implement 200 may be quickly and easily disengaged from a tractor. To disengage the mid-mounted implement, the operator may simultaneously pivot left and right latches 228 to an unlocked position. The operator then may back up the tractor to automatically disengage transverse rod 282 from the hooks at the forward end of the tractor frame. As the tractor continues to back up, it completely disengages and separates the front and rear lift linkages, and the PTO coupling members. Rear latches 228 automatically reset after the rear lift linkage has disengaged.

Figure 7:
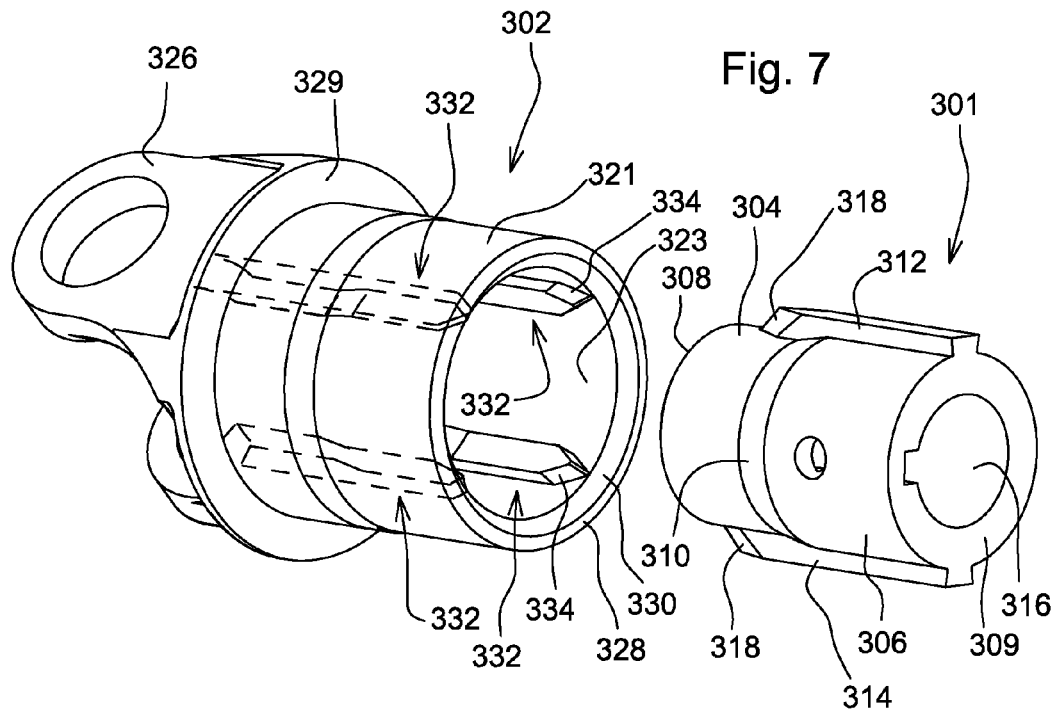
FIG. 7 is a perspective view of a PTO coupling according to one embodiment of the invention.
Figure 8:
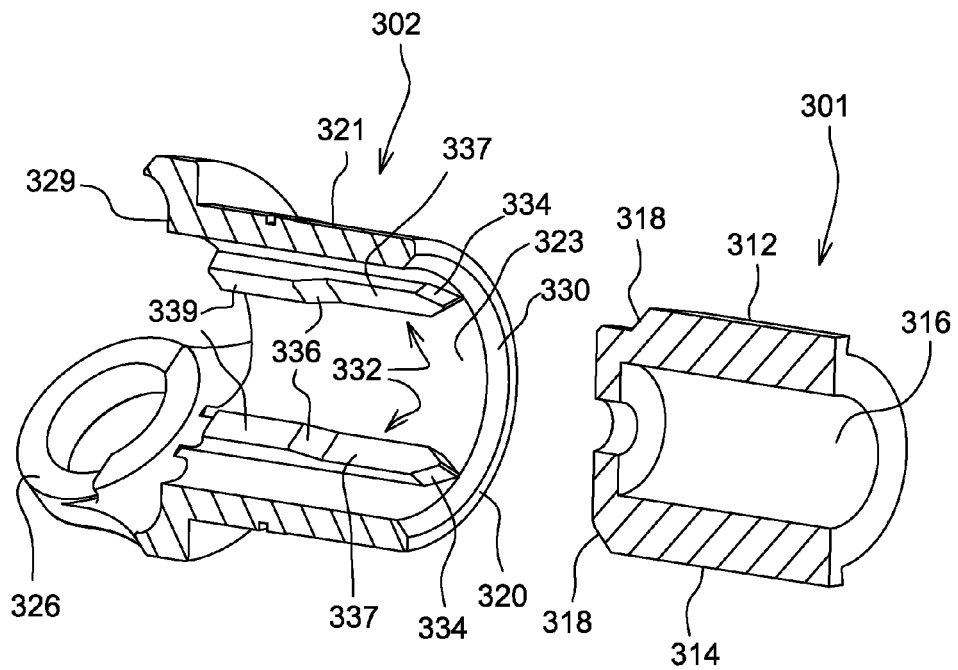
FIG. 8 is a cross section view of a PTO coupling in the first embodiment.

In FIGS. 7-8, male PTO coupling member 301 is shown as a generally cylindrical outer body having first end 308 and second end 309. The male PTO coupling member may have an internal bore 316 to facilitate mounting to an input shaft of a gearbox on a mower deck or other implement. A smaller first diameter 304 of the cylindrical outer body may be adjacent the first end, and a larger second diameter 306 is adjacent the second end. A step 310 may be provided between the smaller and larger diameters of the male PTO coupling member, and the step may be inclined. For example, the step may have dimensions of about 1.5 mm on radius, with an axial length of about 8 mm, and an angle of about 30 degrees. This step provides a circumferential gap as the male PTO coupling member is initially inserted into the female PTO coupling member.

In one embodiment, a pair of external splines 312, 314 may be provided on the cylindrical outer body of male PTO coupling member 301, each of the splines separated by 180 degurss. Spline 314 may extend axially along the cylindrical outer body of the male PTO coupling member between the first and second ends 308, 309. Spline 312 may have a length about 5 mm to about 10 mm less than spline 314, and may extend axially from a location about 5 mm to about 10 mm from the first end to the second end of the male PTO coupling member.

In one embodiment, each external spline 312, 314 may project radially outward about 6 to 10 mm from the cylindrical outer surface of the male PTO coupling member. Each external spline may have a width of about 5 mm to about 10 mm, and the leading edge of each spline may be beveled to a point 318 facing the first end of the male PTO coupling member.

In one embodiment, female PTO coupling member 302 may be a sleeve shaped body 321 having a first end 328 and a second end 329 connected to universal joint 326. The first end of the female PTO coupling member may have a beveled leading edge 330. Four internal splines 332 may be provided in bore 323 as it extends through the female PTO coupling member, each internal spline positioned 90 degrees from the adjacent internal splines.

In one embodiment, internal splines 332 may extend axially through internal bore 323 from first end 328 to second end 329 of the female PTO coupling member. Additionally, each internal spline 332 may be stepped to provide a narrowing clearance, or a stepped surface, in the internal bore for the male PTO coupling member. Adjacent the first end of the female PTO coupling member, a first length 337 of each internal spline may project radially inward about 3 to 5 mm from the internal bore of the female PTO coupling member. Adjacent the second end of the female PTO coupling member, a second length 339 of each internal spline may project radially inward about 6 to 10 mm from the internal bore of the female PTO coupling member. A step 336 may be provided between the first and second splined lengths. The step may be inclined, and may have dimensions of about 1.5 mm on radius, with an axial length of about 8 mm, and an angle of about 30 degrees. The steps on the female splines may be positioned and dimensioned to correspond to the steps on the outer cylindrical body of the male PTO coupling member. Each internal spline 332 in the female coupling member may have a width of about 5 mm to about 10 mm, and the leading edges of each spline may be beveled to a point 334.

In one embodiment, the male and female PTO coupling members can be engaged by axially moving the members together. It is preferred that both PTO coupling members be axially aligned, but they can be engaged successfully even if their longitudinal axes are misaligned initially as much as about 10 degrees. When the male and female PTO coupling members move axially and come into contact, the beveled leading edge of the longer external spline of the male PTO coupling member may contact one of the female PTO coupling member's internal splines, or the beveled leading edge of the female PTO coupling member. While the PTO coupling members continue to be moved axially together, contact of the longer male spline with the female PTO coupling member causes one or both members to rotate and pivot sufficiently to reduce the axial and radial misalignment, and bring the PTO coupling members into closer alignment. For example, it is preferred that the initial alignment will result in a radial gap of about 2 mm to about 4 mm between the male and female PTO coupling members. This gap may be the actual difference in radial dimensions between the first end of the male PTO coupling member and the first end of the female PTO coupling member. Alternatively, one of the splines in the female PTO coupling member may be longer than the female PTO coupling's other internal splines. The longer spline in the female PTO coupling member may contact the male PTO coupling member first, and guide both PTO coupling members into alignment.

When the male PTO coupling member enters further into the female PTO coupling member, the first, smaller diameter end of the male PTO coupling member enters the second, smaller diameter end of the female PTO coupling member bore. The gap between these may be about 0.20 mm. Additionally, the second, larger diameter part of the male member enters the first, larger diameter bore of the female member, with a clearance of about 0.20 mm on radius.

During engagement of the male and female PTO coupling members, one of the splines is sufficiently longer than the other splines so that it initially contacts the opposing PTO coupling member before the other splines. This reduces or eliminates the tendency of splines to catch and hang up on opposing sides of the other PTO coupling member.

Alternatively, a key coupler may engage the male to the female PTO coupling member, using keys in the female member that line up with slots in the male member. Alternatively, a dog coupler may be used, where limited key width allows for alignment without moving parts.

Having described the preferred embodiment, it will become apparent that various modifications can be made without departing from the scope of the invention as defined in the accompanying claims.

The invention claimed is:

1. An automatic connection mechanism for connecting a mid-mounted implement to a tractor, comprising:

a rear lift linkage including a pair of rear draft links having forward ends pivotably connected to the tractor, and rearward ends suspended downwardly and rearwardly, the pair of rear draft links connected together by a rear link rod, the rearward ends having slots aligned with and hooking to engage lift rods on the rear of a mid-mounted implement as the tractor drives over the implement;

a forward lift linkage pivotably connected to the front of the mid-mounted implement, the forward lift linkage aligned with and hooking to engage slots near the front of the tractor as the tractor drives over the implement;

the rear lift linkage and forward lift linkage together forming a four bar parallelogram arrangement;

a first PTO coupling member mounted to the rear lift linkage and that engages a second PTO coupling member on the mid-mounted implement as the tractor drives over the implement; and a pair of rear hangers suspending the rear draft links under the tractor and connected to a bell crank that pivots to raise and lower the rear draft links and the first PTO coupling member together.

2. The automatic connection mechanism of claim 1, wherein the first PTO coupling member is slidably mounted to the rear lift linkage.

3. The automatic connection mechanism of claim 1, further comprising lock plates that pivot to lock the lift rods on the rear of the implement in the slots.

4. The automatic connection mechanism of claim 3, wherein the lock plates are biased to lock the lift rods on the rear of the implement in the slots.

5. The automatic connection mechanism of claim 3, wherein the lock plates are urged by gravity to lock lift rods on the rear of the implement in the slots.

6. An automatic connection mechanism for connecting a mid-mounted implement to a tractor, comprising:

a rear lift linkage including a pair of rear draft links with a rear link rod connecting therebetween and being aligned to enter and engage slots in a pair of rear draft brackets on the mid-mounted implement as the tractor drives over the implement;

a forward lift linkage pivotably connected to the front of the mid-mounted implement, the forward lift linkage being aligned to hook to engage slots near the front of the tractor as the tractor drives over the implement;

the rear lift linkage and forward lift linkage together forming a four bar parallelogram arrangement;

a first PTO coupling member mounted to the rear lift linkage and that engages a second PTO coupling member on the mid-mounted implement as the tractor drives over the implement; and a pair of rear hangers suspending the rear draft links under the tractor and connected to a bell crank that pivots to raise and lower the rear draft links and the first PTO coupling member together.

7. The automatic connection mechanism of claim 6, wherein the first PTO coupling member is pivotably mounted to the rear lift linkage.

8. The automatic connection mechanism of claim 6, further comprising lock plates that pivot to lock the rear link rods in the slots in the rear draft brackets.

9. The automatic connection mechanism of claim 8, wherein the lock plates are biased to lock the rear link rods in the slots in the rear draft brackets.

10. The automatic connection mechanism of claim 8, wherein the lock plates are urged by gravity to lock the rear link rods in the slots in the rear draft brackets.

* * * * *